United States Patent [19]
Winchester

[11] Patent Number: 5,186,310
[45] Date of Patent: Feb. 16, 1993

[54] VERTICAL LIFT CONVEYOR

[76] Inventor: Donald M. Winchester, Rte. 2, Box 398, Kaufman, Tex. 75142

[21] Appl. No.: 908,755

[22] Filed: Jul. 6, 1992

Related U.S. Application Data

[63] Continuation of Ser. No. 831,345, Feb. 5, 1992, abandoned.

[51] Int. Cl.⁵ .......................................... B65G 15/14
[52] U.S. Cl. .............................. 198/626.5; 198/861.1
[58] Field of Search ............... 198/626.1, 626.2, 626.3, 198/626.4, 626.5, 626.6, 604, 861.1, 861.5

[56] References Cited

U.S. PATENT DOCUMENTS

| Re. 9,276 | 7/1880 | Randolph . |
| 142,234 | 8/1873 | Howland et al. . |
| 337,643 | 3/1886 | Whiting . |
| 417,065 | 12/1889 | Miller . |
| 463,110 | 11/1891 | Dryden . |
| 490,171 | 1/1893 | Spencer . |
| 513,391 | 1/1894 | Judie . |
| 535,249 | 3/1895 | Kane . |
| 598,377 | 2/1898 | Kane . |
| 1,669,357 | 5/1928 | Stout et al. . |
| 2,122,052 | 6/1938 | Bell . |
| 2,140,595 | 12/1938 | Rapley . |
| 2,305,044 | 12/1942 | Toews . |
| 2,916,137 | 12/1959 | Hume .............................. 198/626.5 |
| 4,406,359 | 9/1983 | Cole et al. ....................... 198/626.1 |
| 4,416,368 | 11/1983 | Muramatsu et al. . |
| 4,421,223 | 12/1983 | Molins et al. . |
| 4,457,422 | 7/1984 | Hurd . |
| 4,562,918 | 1/1986 | Tschernatsch et al. . |
| 4,666,032 | 5/1987 | Gough ............................. 198/626.2 |

FOREIGN PATENT DOCUMENTS

| 0039620 | 11/1971 | Japan .............................. 198/626.1 |
| 0059112 | 4/1983 | Japan .............................. 198/626.2 |
| 0140909 | 6/1987 | Japan .............................. 198/626.2 |
| 8503496 | 8/1985 | PCT Int'l Appl. ............. 198/626.2 |

Primary Examiner—D. Glenn Dayoan
Attorney, Agent, or Firm—Michael A. O'Neil

[57] ABSTRACT

A vertical lift conveyor has two adjacent, parallel conveyors for simultaneous upward movement of adjacent surfaces of the parallel conveyors, with one of the conveyors having spaced apart flites attached thereto, for transporting bulk food items along a multi-level transport path. The conveyors rotate in opposite directions, but are geared to run from a single gear box to insure equal belt velocity. One of the conveyors is pivotally hinged to the other conveyor for swinging the pivotally attached conveyor away from the remaining conveyor for access to the facing surfaces of the parallel conveyors.

28 Claims, 8 Drawing Sheets

VERTICAL LIFT CONVEYOR

This application is a continuation of Ser. No. 831,345 filed Feb. 5, 1992, now abandoned.

TECHNICAL FIELD

This invention relates generally to vertical conveyors, and more particularly to a vertical conveyor having two adjacent parallel conveyors for transporting bulk food items along a multilevel transport path.

BACKGROUND OF THE INVENTION

In the food preparation and packaging industry, bulk food items are often transported by conveyors from the food processing area to the packaging area. Bulk food items may include crushable items such as chips, pretzels, or nuts, to name only a few. For efficient space utilization, in many cases the processing area is located at a different elevation than the packaging area. In such plant configurations, the bulk food items must be transported from the processing area to the packaging area in an upward direction.

Existing conveyors for vertical transportation of bulk food items consist largely of bucket conveyors extending primarily in an angularly upward or slanted orientation, and occupying more floor space than truly vertical conveyors. Furthermore, the bucket-type configuration often results in excessive spillage of food items as the buckets receive the products from the processing area, and crushing of the food items as they are discharged from the buckets at the packaging area.

Conveyors, other than bucket conveyors, that extend angularly or in a true vertical orientation have traditionally failed to lift the food items without excess spillage or crushing caused by weight of the items or friction from contact with stationary surrounding surfaces. Many prior art vertical conveyors transport bulk food items at a sharp angle from the horizontal orientation in the processing area to a vertical orientation for upward movement to the packaging area elevation. Likewise, the products are returned at sharp angles from the vertical orientation to a horizontal path once the packaging elevation is reached. Such sharp angles often result in excessive crushing or spillage of the food items.

In addition to the foregoing problems experienced with prior art conveyors, cleaning and maintenance access is often difficult or hazardous. Many prior art conveyors are totally enclosed, making access to the conveyor surface difficult. In the case of conveyors employing two adjacent parallel conveyors, access to the adjacent surfaces of the parallel conveyors for cleaning and maintenance has proven difficult. Furthermore, prior art conveyors employing two parallel conveyors require precise timing and continual maintenance to insure similar rotation speeds, typically utilizing separate drive means for each conveyor.

SUMMARY OF THE INVENTION

The vertical conveyor of the present invention overcomes the foregoing and other disadvantages associated with prior art conveyors. A main conveyor is positioned and geared for upward movement simultaneously with a parallel second or cover conveyor. The main conveyor is fitted with a conveyor belt having spaced apart flites for contacting the adjacent surface of the cover conveyor as the food products are carried in a true vertical orientation to the elevation of the packaging area of a food processing and packaging facility.

A shaft controlling rotation of the cover conveyor is drivingly connected to the drive shaft of the main conveyor such that adjacent surfaces of the cover and main conveyors travel upwardly at the same rate. Simultaneous upward travel of adjacent surfaces of the conveyors reduces friction between the food products and surrounding surfaces, thereby reducing breakage and spillage of the products as they are moved along a vertical path from the processing area to the packaging area.

Transition from the horizontal orientation of the processing area to the vertical lift orientation of the conveyor and return to the horizontal orientation of the packaging area is accomplished along a gradual curve, as opposed to the sharp angles of prior art conveyors. The gradual curve combined with spacing of the lift flites a predetermined distance apart results in greater clearance between adjacent flites as the conveyor moves from a horizontal to a vertical position causing less breakage of food items as they travel from horizontal to vertical and back to horizontal.

To facilitate cleaning and maintenance, the cover conveyor is pivotally attached to the main conveyor. Thus, the cover conveyor can be swung away from the main conveyor for easy access to the adjacent surfaces of the cover and main conveyors. Although enclosed in a frame, the downwardly rotating side of the main conveyor may be viewed and accessed for cleaning and maintenance through a hinged transparent door in the frame.

BRIEF DESCRIPTION OF THE DRAWINGS

A more complete understanding of the invention may be had by reference to the following Detailed Description when taken in conjunction with the accompanying Drawings, in which.

DETAILED DESCRIPTION

Figure 1:
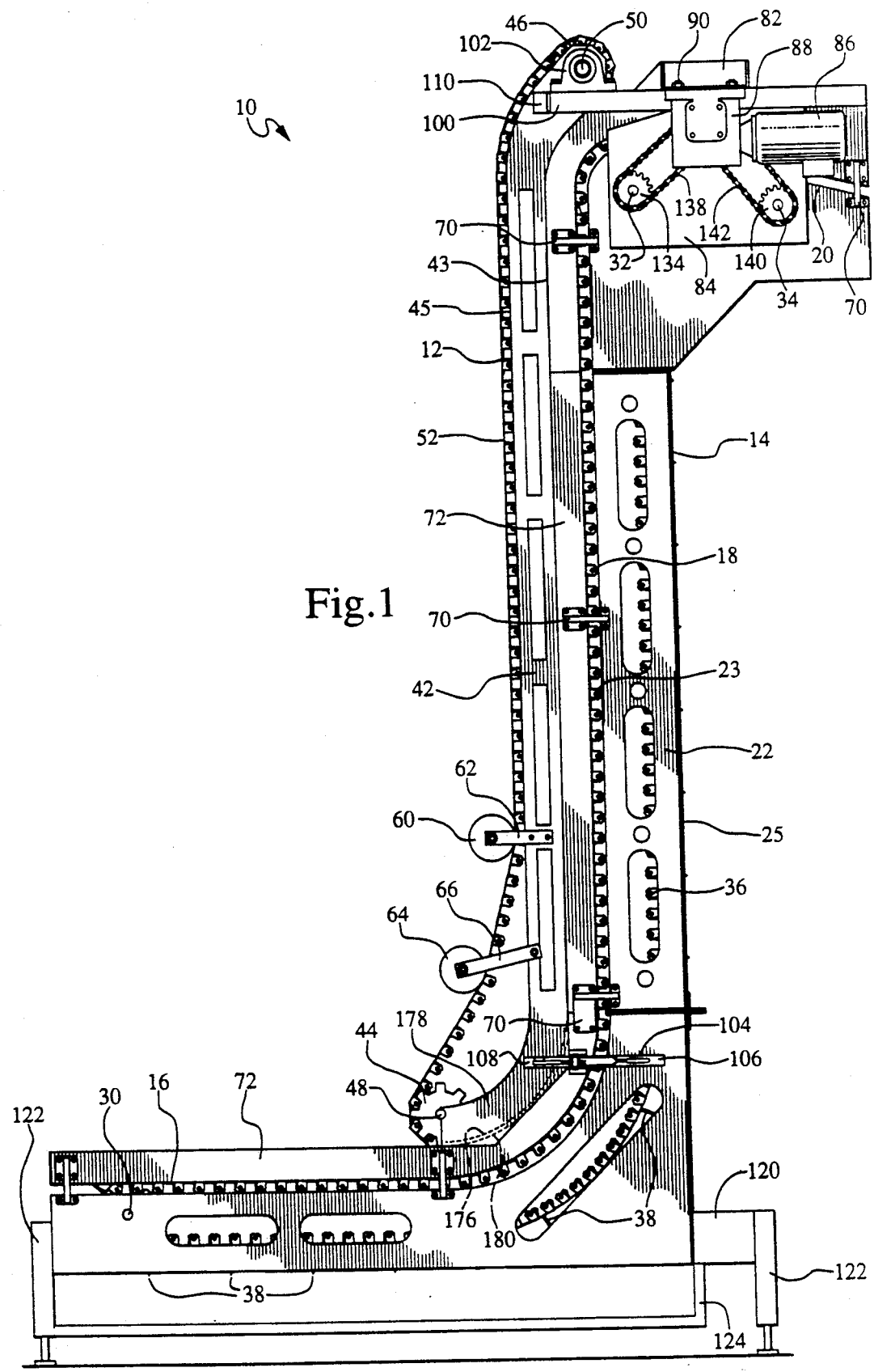
FIG. 1 is a side view of a vertical lift conveyor incorporating the present invention.

Referring now to the Drawings, and particularly to FIG. 1 thereof, there is shown a vertical lift conveyor 10 incorporating the preferred embodiment of the present invention for moving bulk food items over a multi-level transport path in a food preparation and or packaging facility. The conveyor 10 includes a cover conveyor 12 pivotally attached to an adjacent main conveyor 14.

The main conveyor 14 has a generally horizontally extending infeed section 16, a substantially vertically extending lift section 18, and a substantially horizontally extending discharge section 20 defining a transport path for receiving bulk food items at a first elevation and transporting them upwardly for discharge from the conveyor 10 at a second elevation.

Figure 7:
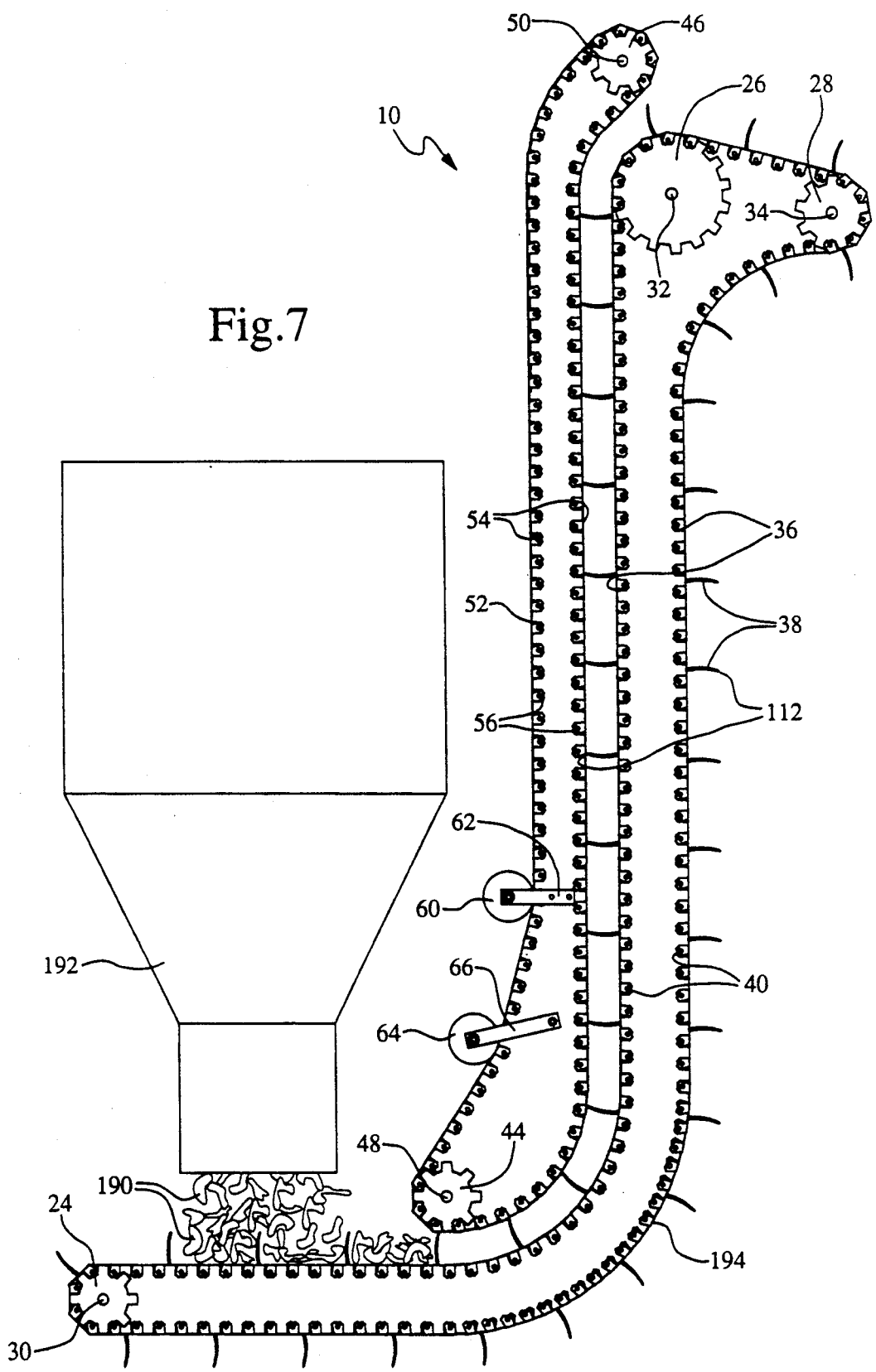
FIG. 7 is a side view of the conveyor belt configuration of the conveyor of FIG. 1 illustrating the receipt of food products onto the main conveyor.

Referring now to FIGS. 1 and 7, the main conveyor 14 has a frame 22 having a first side 23 facing the cover conveyor 12 and a second side 25 facing away from the cover conveyor 12. Rollers 24, 26, and 28 are mounted on shafts 30, 32, and 34, respectively, which are in turn pivotally mounted to the frame 22 for rotational movement therein.

Mounted on rollers 24, 26, and 28, and supported thereby for rotational movement in a clockwise direction is a conveyor belt 36 having spaced apart flites 38. In the preferred embodiment of the invention, as shown in FIG. 7, the rollers 24, 26, and 28 are preferably sprockets for intermeshing with the a toothed interior surface 40 of the conveyor belt 36 to prevent slippage of the conveyor belt 36 as it rotates in a clockwise direction over the rollers 24, 26, and 28.

Referring still to FIGS. 1 and 7, the cover conveyor 12 has a frame 42 having a first side 43 facing the main conveyor 14 and a second side 45 facing away from the main conveyor 14. Rollers 44 and 46 are mounted on shafts 48 and 50, respectively, which are in turn supported by and mounted for rotational movement in frame 42.

A conveyor belt 52 is mounted for rotational movement in a counter-clockwise direction around rollers 44 and 46. Conveyor belt 52 preferably has a smooth exterior surface 54 and a toothed interior surface 56. In the preferred embodiment of the invention, the rollers 44 and 46 are idler sprockets for intermeshing with the toothed interior surface 56 of the conveyor belt 52 to prevent slipping of the conveyor belt 52 as it rotates in a counter-clockwise direction around rollers 44 and 46.

Figures 2, 3:
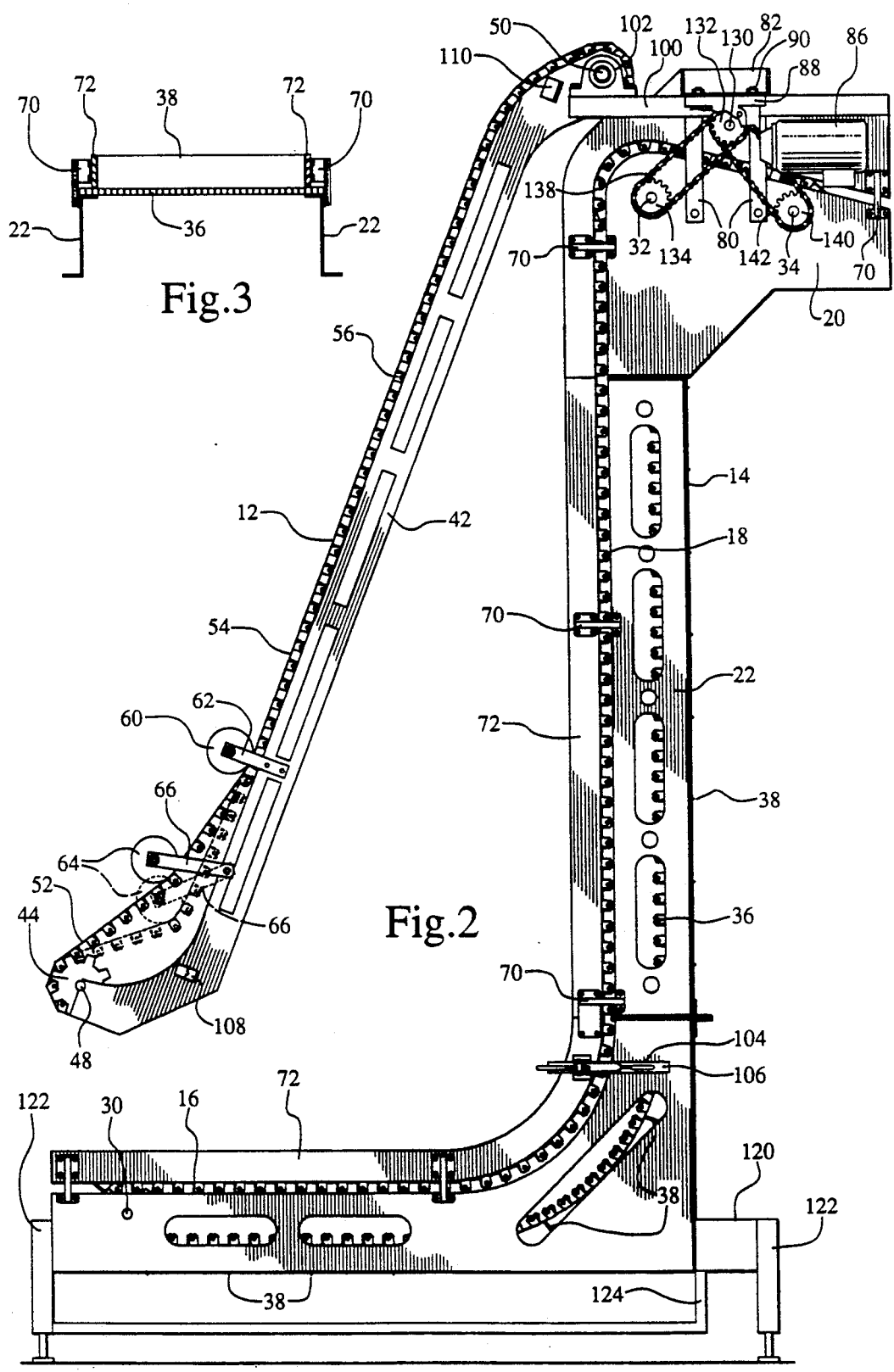
FIG. 2 is a side view of the conveyor of FIG. 1 showing the configuration of one side of the drive mechanism, and illustrating pivotal movement of a cover conveyor portion.
FIG. 3 is a transverse sectional view of a main conveyor portion of the conveyor of FIG. 1.

As shown in FIGS. 1 and 2, a roller 60 is rotationally mounted on a support 62, in turn mounted on the frame 42 of the cover conveyor 12 for retaining the conveyor belt 52 in position on the second side 45 of the frame 42 of the cover conveyor 12. Additionally, a gravitational tension roller 64 is pivotally mounted for rotation on a support 66 which is in turn pivotally mounted to the frame 42 of the cover conveyor 12 to allow the roller 64 to apply pressure to the conveyor belt 52 under the force of gravity to alleviate slack that might otherwise develop in the conveyor belt as a result of age and wear, as illustrated in phantom in FIG. 2.

Referring now to FIGS. 1, 2, and 3, attached to the frame 22 of the main conveyor 14 by means of bracket 70 are opposed sidewalls 72 which extend outwardly from the frame 22 to a point slightly beyond the flites 38 of the conveyor belt 36. The flites 38 are of slightly less width than the conveyor belt 36. The opposed sidewalls 72 are mounted on the brackets 70 such that the sidewalls are spaced apart a distance substantially equal to the width of the flites 38 to prevent crushing or spilling of food items as they travel along the transport path. Thus, the portion of the conveyor belt 36 extending beyond the width of the flites 38 is positioned between the sidewall and the frame 22. Although any number of commercially available products may be used for the sidewalls, the sidewalls of the preferred embodiment of the invention are made of three-quarter inch thick ultra high molecular weight ("UHMW") plastic #1900.

Again referring to FIGS. 1 and 2, attached to the discharge section 20 of the frame 22 of the main conveyor 14 by means of supports 80 is a motor mount 82. A cover plate 84, as shown in FIG. 1, has been removed in FIG. 2 to show the supports 80 for the motor mount 82. A motor 86 and an associated right angle drive 88 are attached to the motor mount 82 with conventional fasteners 90.

Referring still to FIGS. 1 and 2, mounted on supports 80 and extending above the sidewall 72 of the discharge section 20 of the main conveyor 14 are support arms 100 to which the cover conveyor 12 is pivotally attached. Shaft 50 which is mounted in frame 42 and supports roller 46 (as shown in FIG. 7) of the cover conveyor 12 is also mounted for rotational movement in opposed mounting brackets 102 which are in turn mounted on the support arms 100.

Referring to FIGS. 1 and 2, a latch 104 having a first part 106 mounted to the frame 22 of the main conveyor 14 and a second part 108 mounted on frame 42 of the cover conveyor 12 for mating alignment with the first part 106, retains the cover conveyor 12 in position adjacent the main conveyor 14 during operation of the vertical lift conveyor 10. When the latch 104 is released, the cover conveyor 12 may be lifted and pivoted about shaft 50, as illustrated in FIG. 2, to allow easy access to the vertical section 18 of the transport path. Thus, the cover conveyor 12 may be easily pivoted away from the main conveyor 14 to allow ready access for cleaning and maintenance of the vertical lift conveyor 10. A stop 110 mounted on the frame 42 of the cover conveyor 12 contacts support arm 100 to allow the cover conveyor 12 to be returned to an appropriate position to allow slight clearance between the distal end 112 of the flites 38 and the exterior surface 54 of the conveyor belt 52 of the cover conveyor 12, as shown in FIGS. 1 and 7.

Referring again to FIG. 1, the vertical lift conveyor 10 is supported on a base frame 120 having stabilizing legs 122 and a spill tray 124 for catching and removal of any possible spilled or broken food items.

Figure 4:
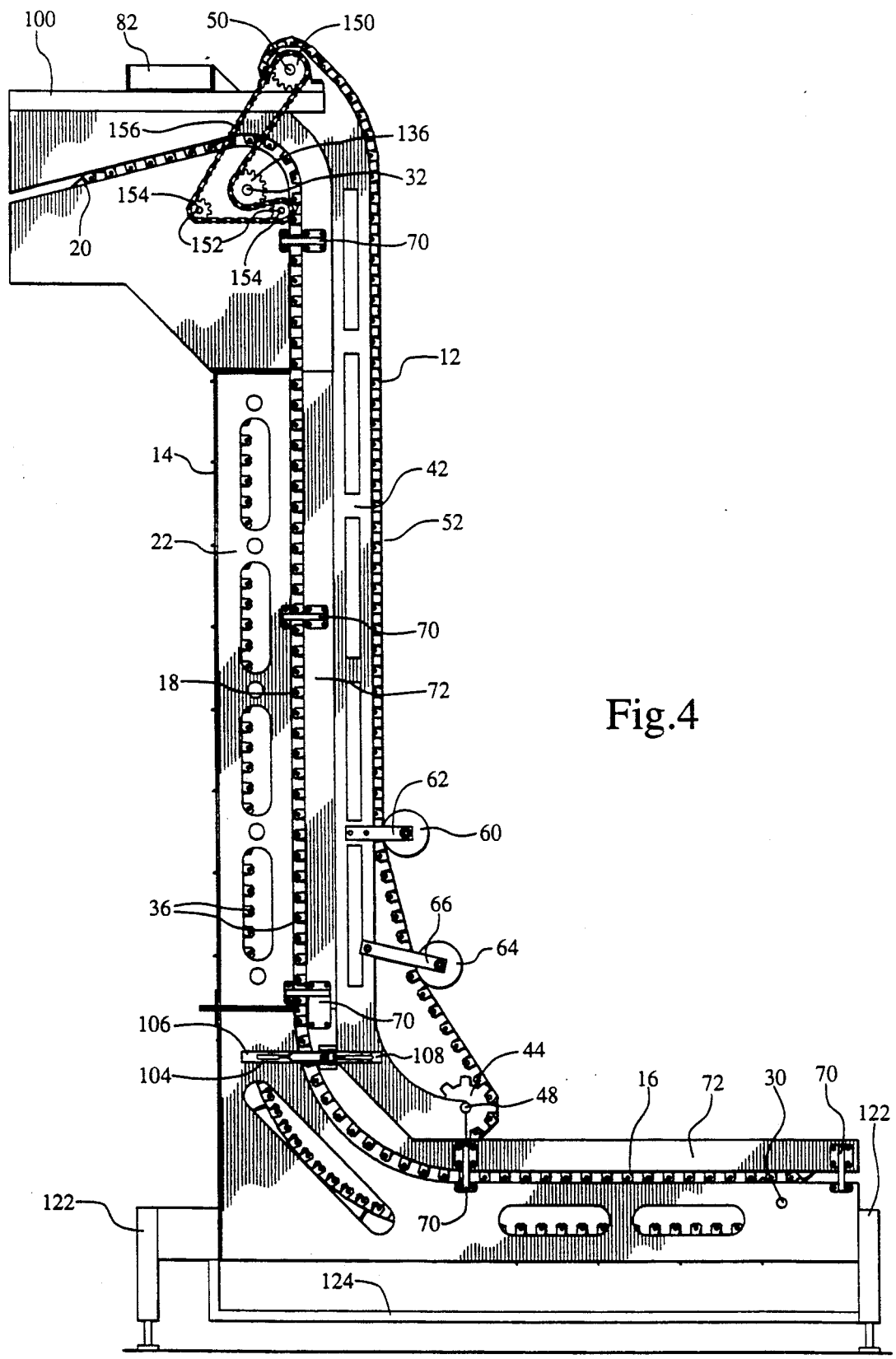
FIG. 4 is a side view of the conveyor of FIG. 1 showing the configuration of the corresponding drive mechanism on the opposed side of the conveyor.

Referring now to FIGS. 1, 2, 4, and 7 a motor 86 provides power to a right angle drive 88 to rotate drive shaft 130 having dual drive sprockets 132 mounted thereon on the power side of the vertical lift conveyor 10 as shown in FIGS. 1 and 2. A sprocket 134 is mounted on drive shaft 32 on the power side of the conveyor 10 with a corresponding sprocket 136 mounted on drive shaft 32 on the opposed side of the conveyor 10 (as shown in FIG. 4). A drive chain 138 drivingly connects sprocket 134 to one of the dual drive sprockets 132 such that rotation of shaft 130 in a clockwise direction upon actuation of the motor 86 rotates sprocket 134 and drive shaft 32 in a clockwise direction, thereby rotating roller 26, as shown in FIG. 7, to rotate the conveyor belt 36 of the main conveyor 14 in a clockwise direction.

Shaft 34 has a sprocket 140 mounted thereon and is located angularly downwardly from drive shaft 130 and sprocket 132, as shown in FIG. 2. A drive chain 142 drivingly connects sprocket 140 to the remaining dual drive sprocket 132 such that rotation of the drive shaft 130 and drive sprocket 132 in a clockwise direction rotates sprocket 140 and shaft 34 in a clockwise direction to rotate roller 28, as shown in FIG. 7, thereby rotating the conveyor belt 36 of the main conveyor 14 in a clockwise direction consistent with the rotation of roller 26, as shown in FIG. 7. As shown in FIGS. 1, 2 and 7, idler shaft 30 having roller 24 mounted thereon rotates in a clockwise direction as a result of the movement of conveyor belt 36 of the main conveyor 14.

Referring now to FIGS. 2, 4, and 7, mounted on the end of drive shaft 50 on the opposed side of vertical lift conveyor 10 is a sprocket 150. Two idler shafts 152 and idler sprockets 154 mounted thereon allow a drive chain 156 to be threaded around drive sprockets 136 and 150, and idler sprockets 154 such that drive shaft 32 acts as a jack shaft to reverse rotational movement of the cover conveyor 12. Therefore, sprocket 150 and shaft 50 rotate in a counter-clockwise direction (when viewed from the power side of vertical lift conveyor 10 as shown in FIG. 2), thereby rotating roller 46, as shown in FIG. 7, in a counter-clockwise direction to move conveyor belt 52 of cover conveyor 12 in a counter-clockwise direction. Idler shaft 48 is rotated by engagement of roller 44 with conveyor belt 52 as it is rotated in a counter-clockwise direction. Thus, upon actuation of the motor 86 the drive configuration shown in FIGS. 2, 4, and 7 rotates the conveyor belt 36 of the main conveyor 14 in a clockwise direction and the conveyor belt 52 of the cover conveyor 12 in a counter-clockwise direction so that facing sides of conveyor belts 52 and 36 move simultaneously in an upward direction at the same rate of speed. Movement of the conveyor belt 52 of the cover conveyor 12 simultaneously with the movement of the flites 38 reduces breakage of food items which might otherwise be caused by friction of the flites 38 moving against an adjacent fixed surface. Because both conveyors are run from the same gear box the same belt velocity is assured, thereby minimizing product abrasion which would otherwise be caused by varying velocities in the adjacent belt.

Figure 5:
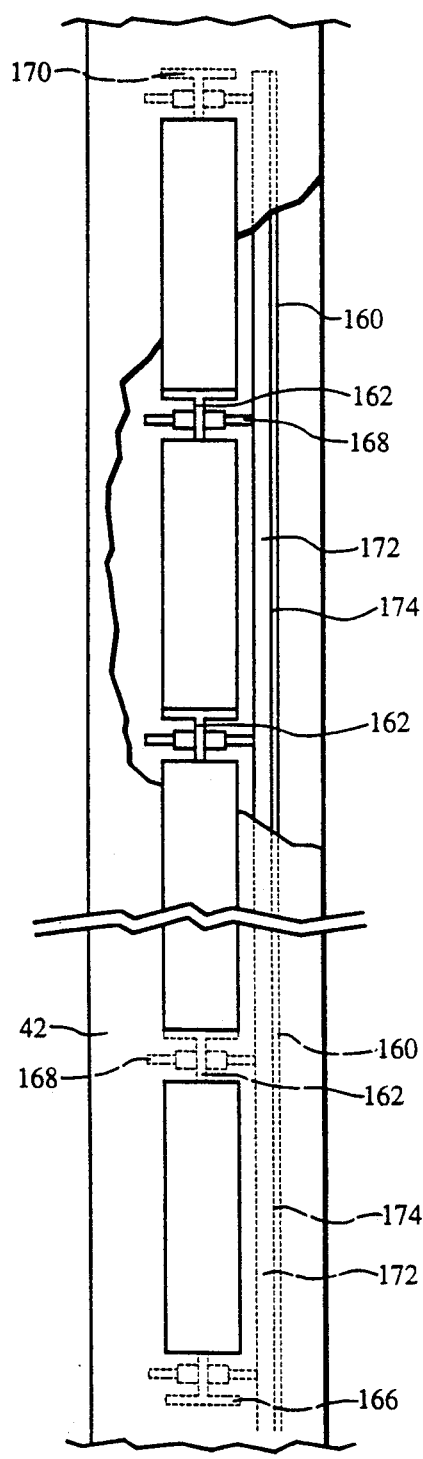
FIG. 5 is a side view of a portion of the frame of the cover conveyor with a portion of one side of the frame broken away to show internally mounted wear strip structure.
Figure 6:
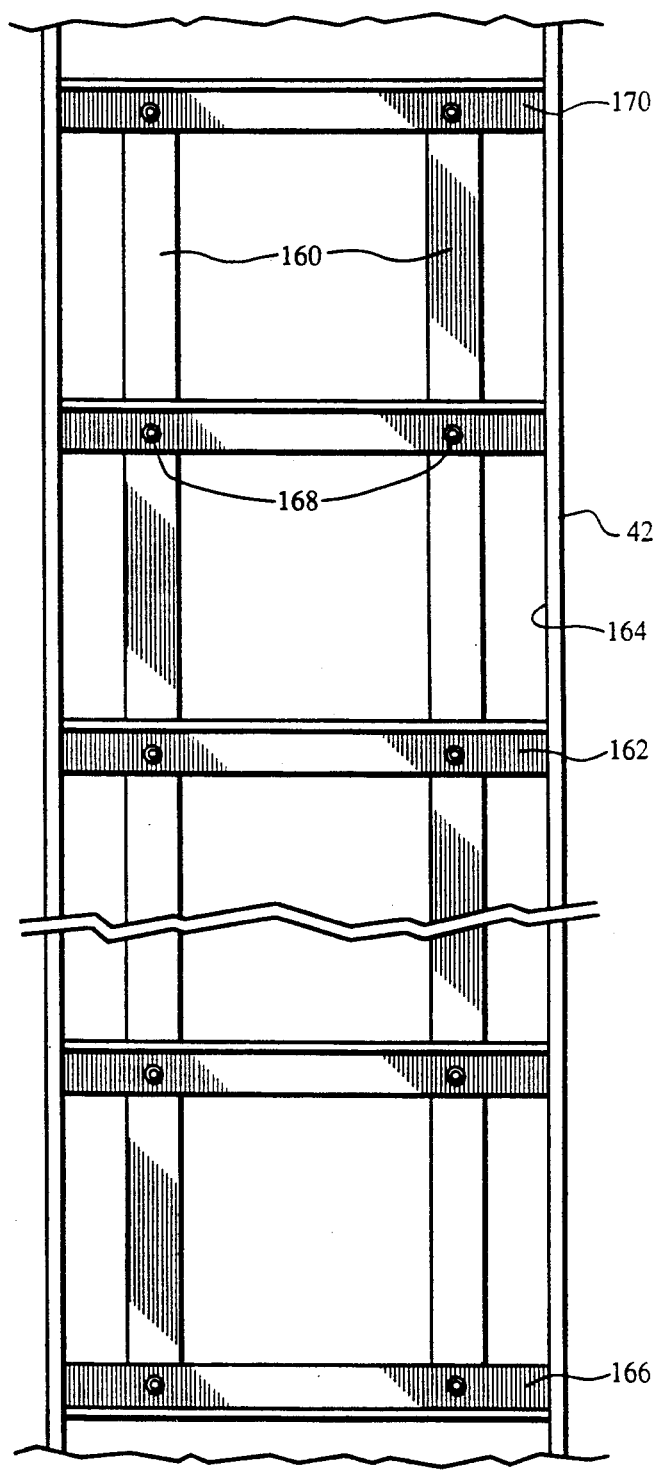
FIG. 6 is a front view of the wear strip structure of FIG. 5.

Referring now to FIGS. 1, 5, and 6, to prevent wear of conveyor belt 52 of cover conveyor 12 wear strips 160 are attached internally to the frame 42 and face outwardly from the first side 43 of the cover conveyor frame 42. Cross members 162 are welded to the interior surface 164 of the frame 42 at spaced apart intervals. The lower-most cross member 166 is placed in an inverted position, as shown in FIGS. 5 and 6.

The wear strips 160 are attached by conventional fasteners 168 to the cross members 170, 162 and 166. The uppermost cross member 170 has holes drilled therethrough for receiving the fasteners 168. The remaining cross members 162 and 166 have slots drilled therein for receiving the fasteners 168, to thereby allow sufficient give to accommodate movement of the conveyor belt 52. Although the wear strip 160 may be one of any number of conventional wear strips available, in the preferred embodiment of the invention the wear strip 160 consist of a wear strip holder 172 with a wear strip cover 174, made from UHMW #1900 plastic, attached thereto.

In the preferred embodiment of the invention, the same material as used for the wear strip cover 174 is also attached along the outermost surfaces of the first side 43 of the frame 42 to prevent wear of the conveyor belt 52 as it travels over the first side 43 of the frame 42. As indicated in FIG. 1 by broken lines, a flange 176 is welded along each interior side 164 of the lower portion 178 of the cover conveyor frame 42. The flange retains the conveyor belt 52 in position adjacent to and in contact with the flites 38 of the conveyor belt 36 of the main conveyor 14. Wear strip cover material 180 is attached to the flange 176 to reduce wear of the conveyor belt 52 as it travels in a curved direction under the flange 176.

Figure 8:
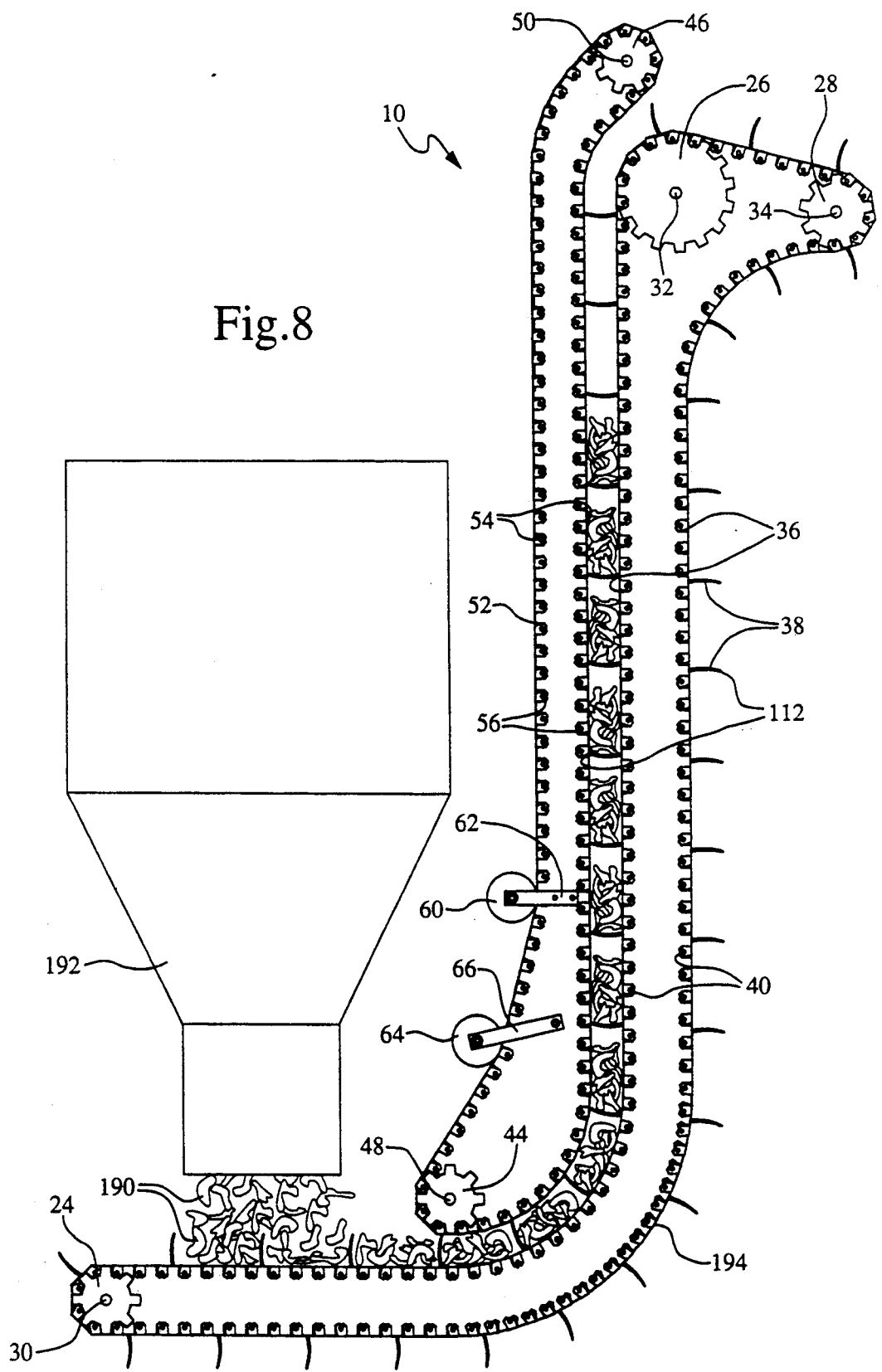
FIG. 8 is a side view similar to FIG. 7 illustrating the vertical transportation of the food products by the conveyor of FIG. 1.
Figure 9:
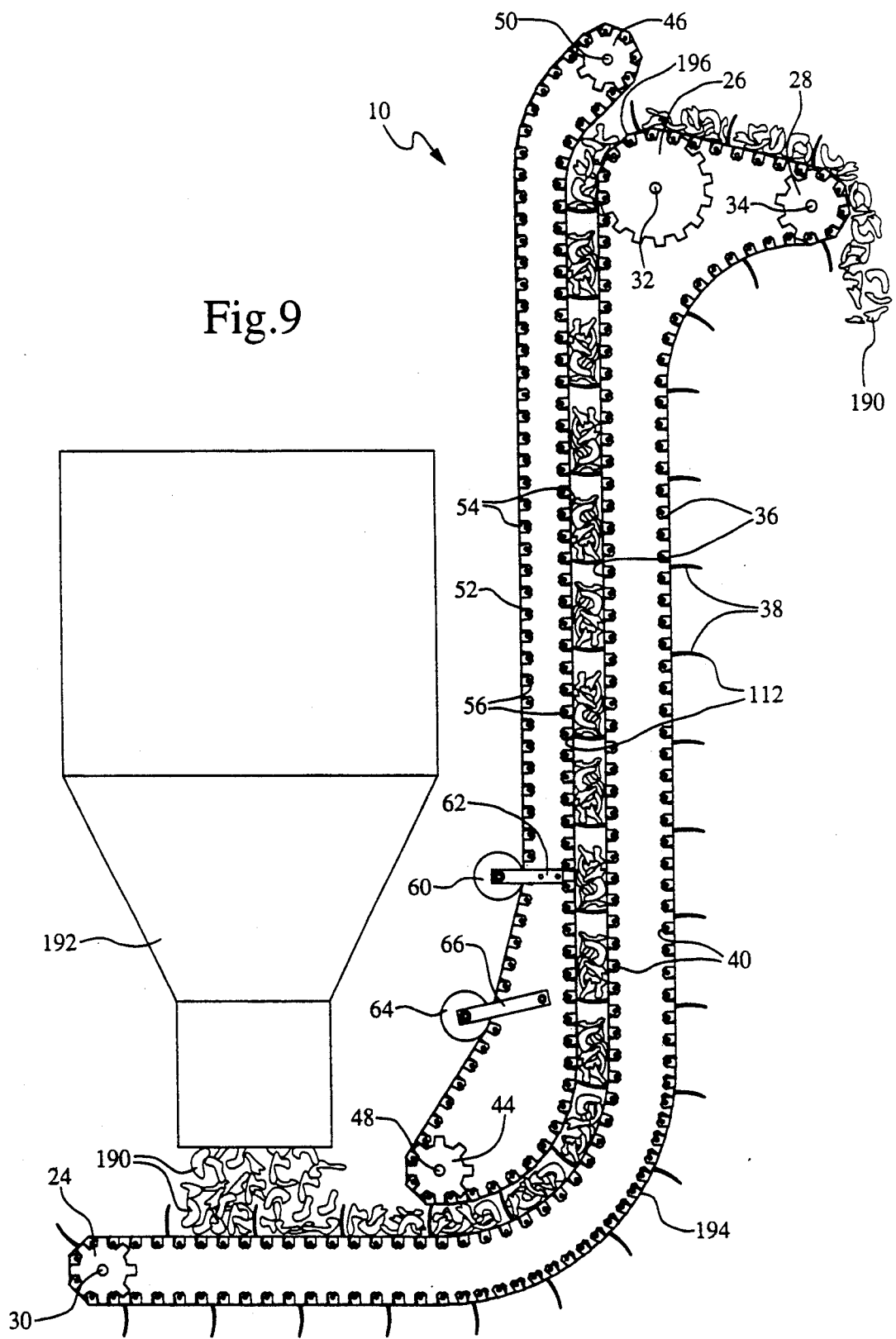
FIG. 9 is a side view similar to FIG. 7 illustrating the discharge of the food products from the conveyor of FIG. 1.

Referring now to FIGS. 7, 8, and 9, there is illustrated the receipt of food items 190 at the infeed section 16 of the main conveyor 14. Although FIGS. 7, 8, and 9 show the food products 190 being received from a hopper 192, the vertical lift conveyor 10 may be used in conjunction with any of a number of other methods of food product transport, such as adjacent conveyor belts. The food products 190 are then transported from a horizontal orientation around a curve 194 to a vertical/lifting orientation as they travel along the vertical portion 18 of the main conveyor 14 of the vertical lift conveyor 10.

In the preferred embodiment of the invention, the curve 194 has an approximate radius of 18" and the flites 38 extend approximately 3" above the surface of the conveyor belt 36. The gradual angle of the curve 194 in conjunction with the length of the flites 38 and the predetermined distance between the flites 38 are sufficient to prevent the flites 38 from angling in on one another and thereby crushing the food items as they travel around the curve 194.

As the food items 190 are returned from a generally vertical/lift orientation to a slightly downwardly sloping orientation and discharged at the discharge section 20 of the main conveyor 14 they round a curve 196. The cover conveyor 12 is curved more gradually than the main conveyor 14 to further reduce the possibility of crushing the food items as they round the curve 196. The discharge section 20 of the main conveyor 14 is slanted gradually and slightly downwardly to allow discharge of the food items 190 onto a receiving surface at a slight angle to prevent the returning flites 38 from crushing the food items 190 on a receiving surface as the flites 38 turn downwardly with the clockwise rotation of the conveyor belt 36.

Figure 10:
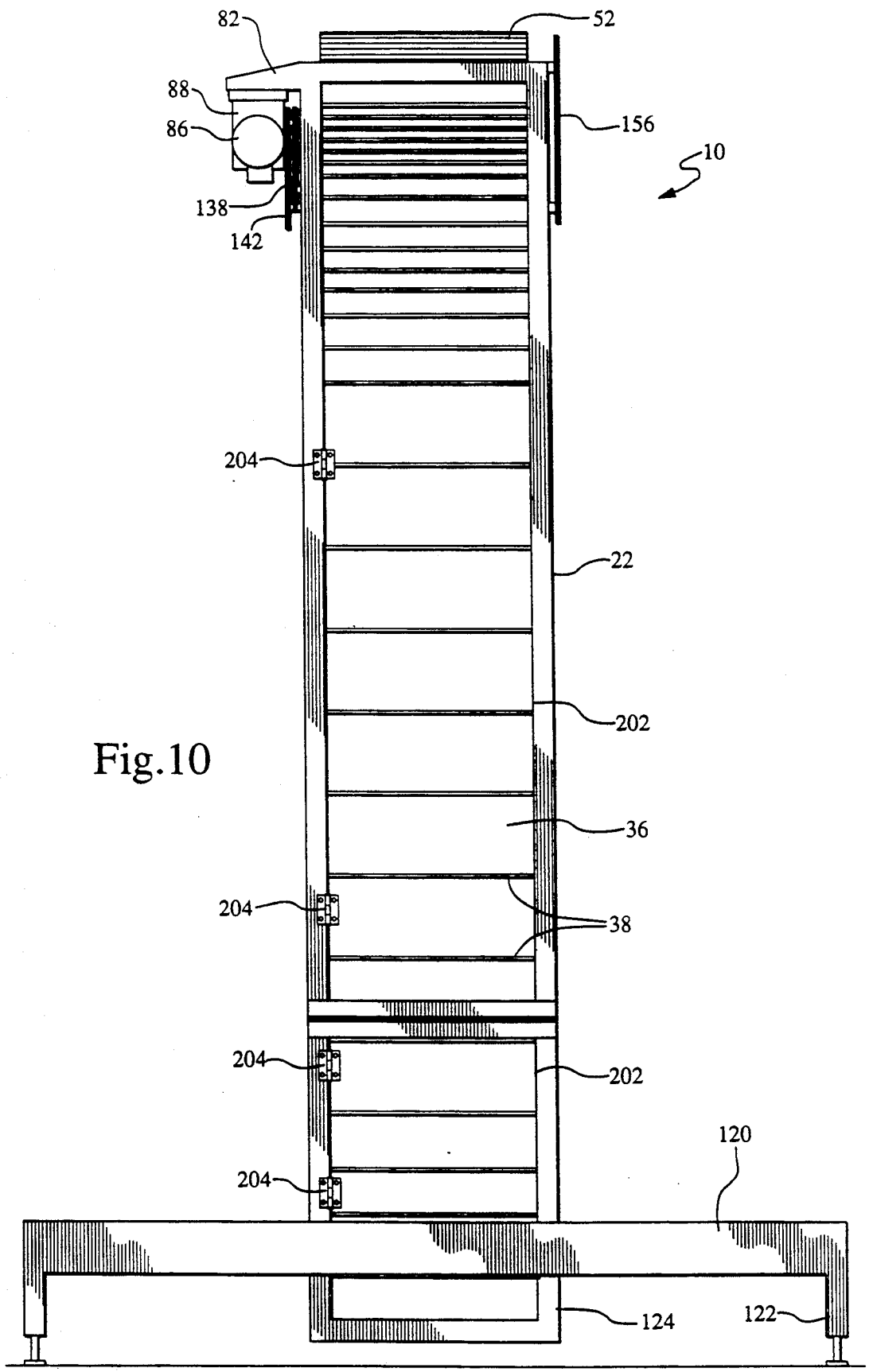
FIG. 10 is a view of the return side of the main conveyor showing transparent access doors.

Referring now to FIG. 10, for improved inspection and access for cleaning and maintenance, the second side 25 of the frame 22 of the main conveyor 14 has attached thereto transparent doors 202 allowing observation of the downward rotation of the conveyor belt 36. The transparent doors 202 are pivotally attached to the frame 22 with conventional hinges 204, allowing opening of the transparent doors 202 to access the conveyor belt 36 and flites 38 of the main conveyor 14 for maintenance and cleaning. Not only do the doors 202 allow visual inspection and access to the conveyor belt 36 of the main conveyor 14, but also serves as a safety feature enclosing the moving conveyor belt 36.

Although preferred embodiments in the invention have been illustrated in the accompanying Drawings and described in the foregoing Detailed Description it will be understood that the invention is not limited to the embodiments disclosed, but is capable of numerous rearrangements, modifications, and substitutions of parts and elements without departing from the spirit of the invention.

I claim:

1. A conveyor for movement of bulk items over a multi-level transport path comprising:

first conveyor means having a generally horizontally extending infeed section at a first elevation, a generally vertically extending lift section extending from the infeed section, and a substantially horizontally extending discharge section extending from the vertical lift section at a second elevation for vertical and horizontal movement of the bulk items along the transport path;

spaced apart lift means attached to the first conveyor means for supporting the bulk items for movement along the transport path;

second conveyor means extending in a generally vertical position adjacent to the first conveyor means for contacting the lift means for retaining the bulk items in position between the first conveyor means and the second conveyor means; and pivot means for pivotal attachment of the second conveyor means to the first conveyor means for pivotal movement of the second conveyor means away from the first conveyor means for cleaning and maintenance.

2. The conveyor of claim 1, further comprising side retaining means attached to the first conveyor means and extending perpendicular to the first conveyor means and extending perpendicular to and contacting the second conveyor means for retaining the bulk product between the second conveyor means and the first conveyor means.

3. The conveyor of claim 1, wherein the first conveyor means further comprises:

a first side facing the second conveyor means for receiving and transporting bulk items;

a second side facing away from the second conveyor means;

said infeed section receiving bulk product onto the conveyor between the spaced apart lift means;

said lift section lifting the bulk product from the first elevation to a second elevation; and said discharge section extending outwardly and angularly downwardly from the vertical section at the second elevation for discharging the bulk product.

4. The conveyor of claim 3, further comprising transparent cover means enclosing the second side of the first conveyor means for visual inspection and maintenance of the first conveyor means.

5. The conveyor of claim 4, further comprising means pivotally attaching the cover means to the first conveyor means for allowing the cover means to swing open for accessing the second side of the first conveyor means.

6. The conveyor of claim 1, further comprising first rotation means attached to the first conveyor means for rotational movement of the first conveyor means.

7. The conveyor of claim 6, further comprising second rotation means attached to the second conveyor means and drivingly connected to the first rotation means for rotational movement of the second conveyor means corresponding to the first conveyor means.

8. The conveyor of claim 7, further comprising drive means for drivingly connecting the first rotation means to the second rotation means for rotating the second rotation means.

9. The conveyor of claim 1, further comprising wear strips attached adjacent the second conveyor means for protection of the second conveyor means.

10. A conveyor for movement of bulk items over a multi-level transport path comprising:

a main conveyor belt rotatably mounted for movement of the bulk items along the transport path;

first frame means having first and second sides for supporting the main conveyor belt for vertical and horizontal movement along the transport path;

spaced apart lift means attached to the main conveyor belt for supporting the bulk items;

a cover conveyor belt extending in a generally vertical position adjacent to the first side of the first frame means for contacting the lift means attached to the main conveyor for retaining the bulk items in position as the main conveyor belt travels over the transport path;

second frame means having first and second sides for supporting the cover conveyor belt for rotational movement of the belt over the second frame means in a direction opposite the main conveyor belt such that adjacent surfaces of the cover conveyor belt and main conveyor belt travel simultaneously in a generally vertical direction;

side retaining means attached to the first frame means and extending perpendicular to and overlapping the main conveyor belt and extending perpendicular to and contacting the cover conveyor belt for retaining the bulk product between the cover conveyor belt and the main conveyor belt;

drive means for rotating the main and cover conveyor belts; and pivot means for pivotal attachment of the second frame means to the first frame means for pivotal movement of the cover conveyor belt away from the main conveyor belt for cleaning and maintenance.

11. The conveyor of claim 10, further comprising lock means for retaining the second conveyor means in position adjacent the first conveyor means during operation.

12. The conveyor of claim 10, wherein the first frame means further comprises;

a first side facing the cover conveyor belt for receiving and transporting bulk items;

a second side facing away from the cover conveyor belt;

an infeed section extending in a generally horizontal orientation at a first elevation for receiving bulk product onto the main conveyor belt between the spaced apart lift means;

a lift section extending in a generally vertical orientation for lifting the bulk product from the first elevation to a second elevation; and an output section extending outwardly and angularly downwardly from the vertical section at the second elevation for discharging the bulk product.

13. The conveyor of claim 12, further comprising transparent cover means enclosing the second side of the first frame means for visual inspection and maintenance of the main conveyor belt as it travels over the second side of the first frame means.

14. The conveyor of claim 13, further comprising means pivotally attaching the cover means to the first frame means for allowing the cover means to swing open for accessing the second side of the first frame means and the main conveyor belt.

15. The conveyor of claim 10, further comprising first rotation means attached to the first frame means for rotational movement of the main conveyor belt over the first frame means.

16. The conveyor of claim 15, further comprising second rotation means attached to the second frame means and drivingly connected to the first rotation means for rotational movement of the cover conveyor belt over the second frame means such that adjacent sides of the cover conveyor belt and the main conveyor belt move simultaneously upwardly.

17. The conveyor of claim 16, further comprising drive means for drivingly connecting the first rotation means to the second rotation means for rotating the second rotation means to move the cover conveyor belt over the second frame means.

18. The conveyor of claim 10, further comprising wear strips attached to the second frame means for protection of the cover conveyor belt as it travels over the second frame means.

19. The conveyor of claim 10, further comprising a gravity roller attached to the second frame means such that the roller contacts the cover conveyor belt as it travels over the first side of the second frame means for reducing slack in the cover conveyor belt to avoid slipping of the belt as it travels over the second frame means.

20. A vertical lift conveyor for movement of crushable bulk items over a multi-level transport path comprising:
 a main conveyor belt rotatably mounted for movement of the crushable bulk items along the transport path;
 a first frame having first and second sides for supporting the main conveyor belt for vertical and horizontal movement along the transport path;
 spaced apart flites attached to the main conveyor belt for supporting the bulk items for movement along the transport path;
 a cover conveyor belt extending in a generally vertical position adjacent to the first side of the first frame means for contacting the flites attached to the main conveyor belt for lifting the bulk items in an upward direction between the main conveyor belt and the cover conveyor belt with groups of the bulk items separated one from another by the flites to prevent the weight of the uppermost bulk product from crushing the underlying bulk product as it travels upwardly;
 a second frame having first and second sides for supporting the cover conveyor belt for rotational movement of the cover conveyor belt over the second frame in a direction opposite the main conveyor belt such that adjacent surfaces of the cover conveyor belt and main conveyor belt travel simultaneously in a generally vertical direction;
 pivot means for pivotal attachment of the second frame to the first frame for pivotal movement of the cover conveyor belt away from the main conveyor belt for cleaning and maintenance;
 a lock for retaining the cover conveyor in position adjacent the main conveyor during operation; and
 sidewalls attached to the first frame and extending perpendicular to and overlapping the main conveyor belt and extending perpendicular to and contacting the cover conveyor belt for retaining the bulk products between the cover conveyor belt and the main conveyor belt.

21. The conveyor of claim 20, wherein the first frame further comprises:
 an infeed section extending in a generally horizontal orientation at a first elevation for receiving bulk product onto the main conveyor belt between the spaced apart flites;
 a lift section extending from the infeed section in a generally vertical orientation for lifting the bulk product from the first elevation to a second elevation; and
 an output section extending outwardly and angularly downwardly from the vertical section for discharging the bulk product at the second elevation.

22. The conveyor of claim 20, further comprising a transparent cover pivotally attached to the first frame and enclosing the second side of the first frame for visual inspection and maintenance of the main conveyor belt as it travels over the second side of the first frame.

23. The conveyor of claim 20, further comprising first rotation means attached to the first frame for rotational movement of the main conveyor belt over the first frame.

24. The conveyor of claim 23, further comprising power means for actuation of the first rotation means.

25. The conveyor of claim 23, further comprising second rotation means attached to the second frame and drivingly connected to the first rotation means for rotational movement of the cover conveyor belt over the second frame such that adjacent sides of the cover conveyor belt and the main conveyor belt move simultaneously upwardly.

26. The conveyor of claim 25, further comprising drive means for drivingly connecting the first rotation means to the second rotation means for rotating the second rotation means to move the cover conveyor belt over the second frame.

27. The conveyor of claim 20, further comprising wear strips attached to the second frame for protection of the cover conveyor belt as it travels over the second frame.

28. The conveyor of claim 20, further comprising a gravity roller attached to the second frame such that the roller contacts the cover conveyor belt as it travels over the first side of the second frame for reducing slack in the belt to avoid slipping of the belt as it travels over the second frame.

* * * * *